March 25, 1930. J. F. HIXON 1,752,087
DUAL FLUID PRESSURE CONTROLLING DEVICE
Filed Nov. 16, 1927
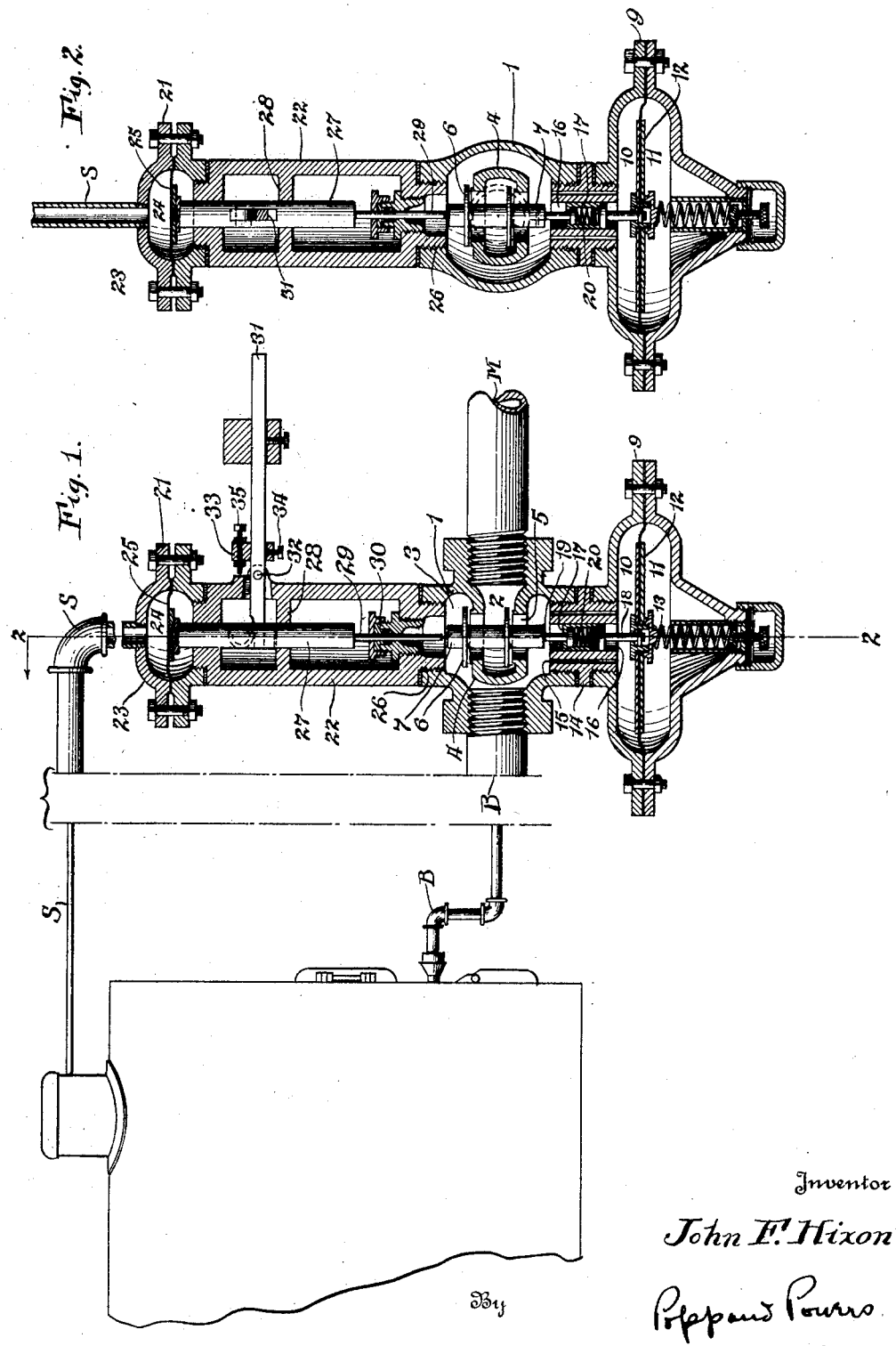
Inventor
John F. Hixon Patented Mar. 25, 1930

1,752,087

UNITED STATES PATENT OFFICE

JOHN F. HIXON, OF EBENEZER, NEW YORK, ASSIGNOR TO GILFILLAN MACHINE WORKS, INC., OF EBENEZER, NEW YORK, A CORPORATION OF NEW YORK

DUAL FLUID-PRESSURE-CONTROLLING DEVICE

Application filed November 16, 1927. Serial No. 233,611.

This invention relates to dual control valve regulators and more particularly, the invention pertains to a combined regulator of fuel gas and generated steam in a gas fired steam generator or boiler.

An object of the invention is to provide a dual control arrangement for the fuel control valve of the boiler which automatically opens the valve and maintains a constant gas pressure when the steam pressure is below a certain predetermined value and which automatically effects the closure of said valve when the steam pressure reaches such predetermined value.

Another object of the invention is to render the valve opening means inoperative when the valve closing means has operated, and, to maintain the valve opening means inoperative as long as the predetermined steam pressure is maintained.

A further object is to embody both control arrangements and valve in a unitary structure having a relatively simple assembly of operating parts.

An embodiment of my invention is illustrated in the accompanying drawings, wherein:

Figure 1 is a view showing the arrangement of the device with respect to a boiler and showing the device in section.

Figure 2 is a section of the device along line 2—2 of Fig. 1.

The invention essentially includes a throttling or fuel valve interposed between the main gas line M and boiler feed line B together with a gas pressure regulator and a steam pressure controlled actuator. The gas pressure regulator is normally operative to control the movement of the valve and thereby to maintain the gas pressure in the feed line B at a constant value while the steam pressure controlled actuator which is normally inoperative becomes operative to close the valve when the steam pressure reaches a predetermined value.

The fuel valve casing indicated at 1, is provided with an inlet chamber 2 and an outlet chamber 3. The inlet chamber 2 is formed by an inwardly extended and suitably shaped member 4 which is preferably an integral part of the casing 1. The communication of the inlet and outlet chambers is controlled by a double seated valve comprising the openings 5, formed in opposed walls of the member 4, and valves 6 which are secured to a common stem 7. The opposed walls of the valve casing 1 are provided with threaded apertures located directly in line with the valve openings 5. These apertures provide a means for connection to the valve of the gas pressure regulator and steam pressure controlled actuator mechanisms respectively.

The gas pressure regulator indicated generally at 9, may be of any suitable construction and in the present illustration comprises a housing which is divided by a suitably located diaphragm 12, into an inner gas chamber 10 and an outer chamber 11, the latter being open to atmosphere. The diaphragm 12 is normally biased toward the inner chamber 10 by an adjustable spring 13 secured in the outer chamber 11.

The gas pressure regulator 9 is secured to the valve casing by means of a bushing 14 which is threaded into one of the casing apertures. This bushing is provided with a series of longitudinal passages 15 which places the outlet chamber 3 of the valve and the inner chamber 10 of the regulator in open communication. The bushing is also formed with a centrally located longitudinal passage 16 through which the connecting link between the diaphragm 12 and the valve stem 7 passes. This link includes a cylinder 17 one end of which is threaded to receive the adjacent end of the diaphragm rod 18. The other end of the cylinder is flanged inwardly to prevent the enlarged end of a rod 19 which extends into the cylinder, from slipping out. The other end of the rod 19 is secured to the valve stem 7. A spring 20 is positioned within the cylinder between the adjacent ends of the rods 18 and 19.

The steam pressure controlled actuator indicated generally at 21 includes a bracket 22 and a housing 23 which is threaded or otherwise secured to one end of the bracket. This housing is formed with an outer steam chamber 24 by the usual diaphragm 25, the chamber being connected to the steam chamber of the boiler by a pipe S.

The actuator 21 is secured to that aperture of the valve casing which is directly opposite from the regulator 9, by means of a nipple 26 screwed into said aperture. A stem 27 is attached to one side of the diaphragm 25 and extends through the adjacent end of the bracket toward the valve. This stem is aligned with the valve stem 7 and this alignment maintained by guides 28. The lower end of the stem is connected to a rod 29 which extends through the nipple 26 to a point adjacent the valve stem 7 but spaced therefrom a distance sufficient to permit the free regulation of the valve by the regulator 9 while at the same time permitting the actuator to close the valve when so operated. A packing 30 is interposed between the rod 29 and nipple 26. The stem 27 is biased against the diaphragm 25 by the weighted lever 31 which is pivotally mounted on the bracket as at 32.

In order to prevent the gas from being completely shut off by the actuator 21 and the burner flame thereby extinguished an attachment 33 is secured to the lever 31 by means of a screw 34. The upper end of the attachment carries a transverse screw 35 which may be adjusted toward or away from the bracket 22. This screw is normally adjusted to a position where it will stop the upward movement of the lever 31 and hence the downward valve closing movement of the stem 27 just short of the full closure position of the valve.

In the operation of the device it is to be remembered that the regulator is normally operative to keep the valve open while the actuator is normally inoperative. When gas is admitted to the main gas line M, it passes through the valve to the burner of the boiler. It also passes from the valve outlet chamber through the passages 15 to the chamber 10 of the housing. Now assuming that the regulator is adjusted to maintain a gas pressure of 5 pounds, it is apparent that should the pressure exceed that amount, the gas in chamber 10 will move the diaphragm 12 against the action of the spring 13 and thus tend to close the valve. Similarly when the gas pressure falls below 5 pounds, the spring will open the valve. In this manner a pressure of 5 pounds is maintained while the boiler builds up the steam pressure.

Now if it is desired to limit the steam to a pressure not exceeding ten pounds, for example, the weight on the lever 31 is adjusted in the well known manner. When the steam builds up a pressure of this magnitude, the diaphragm 25 will move the stem 27 against the action of the weighted lever and in this manner move the valve to closed or substantially closed position through the agency of the stem 7 and the rod 29. With the gas shut off, the steam pressure will fall, permitting the weighted lever to move the stem 27 and hence the rod 29 back to normal position thus leaving the regulator 9 free to regulate the gas pressure and again build up the steam pressure.

It is noted that when the actuator 21 has operated to close the valve, the pressure in feed line B is lost and hence no gas pressure is present in the chamber 10 to react against the spring 13. Consequently this spring will tend to reopen the valve and in some cases, as for instance in the more delicate low pressure devices it might quite readily do so. This would restore the gas pressure in chamber 10 causing the valve to close again whereupon the action would be repeated and the valve fluctuated. To avoid this result, a spring connection between the rods 18 and 19, is utilized whereby the movement of the diaphragm 12 merely effects the compression of the spring 20 without causing the valve to open. Where the device is used for higher pressures, the spring connection is not necessary and a straight rod connecting the diaphragm 12 and stem 7 together may be substituted therefor.

It will be understood that the description of the specific details of the embodiment disclosed is not to be taken as imposing any limitation upon the appended claims not inherent in their terms nor otherwise than for the purpose of exposition. Thus modifications or variations may of course be resorted to within the contemplated scope of the invention. For example, I may substitute a lever connection between the diaphragms and the valve whereby the movement of the diaphragms may be magnified. This construction generally involves offsetting the diaphragm housing and is so well known that its illustration is deemed unnecessary. Furthermore while the device has been illustrated as applied to a gas fired boiler it may obviously be applied to other uses.

Having described my invention, I claim:

1. In a device for controlling the fluid fuel pressure and the generated vapor pressure of a boiler, the combination of a valve casing having inlet and outlet chambers for said fluid fuel, means normally operative to control the fluid pressure in said outlet chamber, means subject to said vapor pressure and adapted to close the valve when the vapor pressure reaches a predetermined value and means for preventing the first mentioned means from opening said valve while the vapor pressure remains at the predetermined value.

2. In a dual fluid pressure controlling device, the combination of a casing having inlet and outlet chambers for one of said fluids, a valve controlling the communication of said chambers, a diaphragm subject to the fluid pressure in the outlet chamber and operatively connected to said valve to maintain said pressure constant while the other fluid pressure is below a predetermined value, means for closing said valve when the pressure of said other fluid reaches the predetermined value and means interposed in the connection between the diaphragm and valve to prevent said diaphragm from effecting a reopening of the valve while the pressure of said other fluid remains at the predetermined value.

3. In a vapor generating system, a boiler having a fluid fuel feed line and a vapor pressure chamber in combination with a control valve interposed in said feed line, a diaphragm subject to the pressure of the fluid fuel in the boiler side of said valve, a connection between said diaphragm and said valve, said diaphragm being adapted to maintain said fuel pressure constant while the vapor pressure is below a predetermined value, means subject to said vapor pressure and operatively connected to said valve to close the same when the vapor pressure reaches said predetermined value, and a spring interposed in the connection between said valve and said diaphragm and arranged to prevent the reopening of the valve while the vapor pressure remains at the predetermined value.

In testimony whereof I affix my signature.

J. F. HIXON.